D. Cole,
Cage Trap,
No. 57,480.        Patented Aug. 28, 1866.
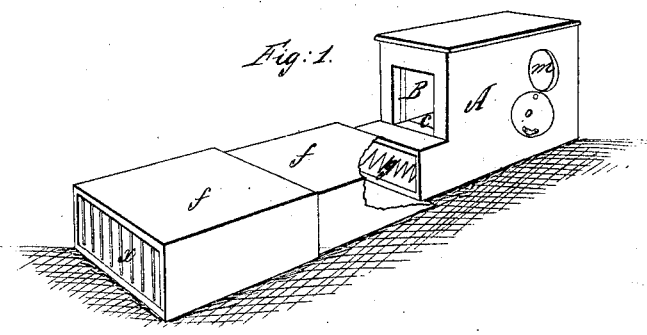
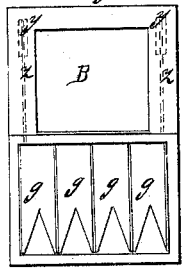
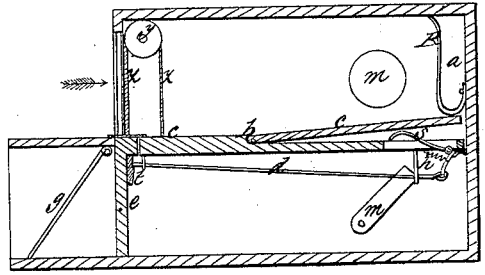
Witnesses:
C Browning
Browning
Inventor:
Daniel Cole

UNITED STATES PATENT OFFICE.

DANIEL COLE, OF ORWELL, PENNSYLVANIA.

IMPROVEMENT IN ANIMAL-TRAPS.

Specification forming part of Letters Patent No. 57,480, dated August 28, 1866.

*To all whom it may concern:*

Be it known that I, DANIEL COLE, of Orwell, in the county of Bradford and State of Pennsylvania, have invented certain new and useful Improvements in Animal-Traps; and I do hereby declare that the following is a full, clear, and exact description of the same, reference being had to the accompanying drawings, and the letters of reference marked thereon, making a part of this specification, in which—

Figure 1 represents a perspective; Fig. 2, a longitudinal section, and Fig. 3 an end view.

A represents a wooden box, made in the form shown, and provided with circular openings $n$ on each side, which can be covered by the metal plates $o$. Longitudinally within or near the center of said box is a treadle, $c$, which is suspended by a pivot near the end of the box, and a longitudinal rod, $d$, underneath. The treadle $c$ is split about one-half of its length and pivoted at $b$, where it is held slightly above the main portion by a crooked spring, $s$. This spring is a portion of a small spiral spring (see $n$) which is attached to one extremity of the rod $d$. It will be perceived that rod $d$ is connected to the treadle by means of small keepers, while the forward end rests upon a shoulder, $t$, formed on the inner side of the door $e$, when said door is down.

$y$ represents a windlass secured to the upper portion of the forward end of the box, and over which passes a cord, $z$, at each end. These cords are attached to the top of the door and end of the treadle, so that when one side of cords draws up the door the other ends will necessarily carry that end of the treadle down.

$g$ represents four or more forked metal plates, which are secured in an oblique manner in the forward end of the box A, and swing upon a horizontal wire which attaches them to the box.

$a$ is a chamber, wherein the bait is kept and secured by a slotted metal plate, R.

$ff$ represent two or more boxes, which set one within the other, one open at one end, caged at the front end, as seen at $x$, and connected to the mouth of the box A.

The operation of this device is as follows: The animal passes in at the opening B upon the end of treadle $c$, when the treadle is prevented from going down by the rod $d$ and shoulder $t$ until it (the animal) passes the point $b$. The weight upon this point forces the spring down and to the rear, when the rod is also carried backward off of the shoulder $t$, and the treadle slowly drops without noise. It will be seen that immediately after the treadle goes down the door $e$ goes up and closes the entrance B; so the only route of passage for the animal is through the gates $g$ and into the boxes $ff$. This trap is set by means of a button, $m$, underneath the treadle, so that said treadle is prevented from lowering when the button is in a vertical position.

Having thus fully described my invention, what I claim as new, and desire to secure by Letters Patent, is—

The treadle $c$, arranged within the box A, with the rod $d$, springs $s$ and $n$, door $e$, windlass $y$, and cords $z z$, by which means the animal is lowered into the under chamber of box A, closing the door through which it entered and imprisoning itself, after passing through the gates $g$ into the supplementary chambers, when arranged in the manner herein specified.

In witness that I claim the foregoing I have hereunto set my name.

DANIEL COLE.

In presence of—
C. M. ALEXANDER,
J. M. MASON.